March 4, 1930.  G. WALTHER  1,749,745
BRAKE DRUM
Filed Nov. 25, 1925
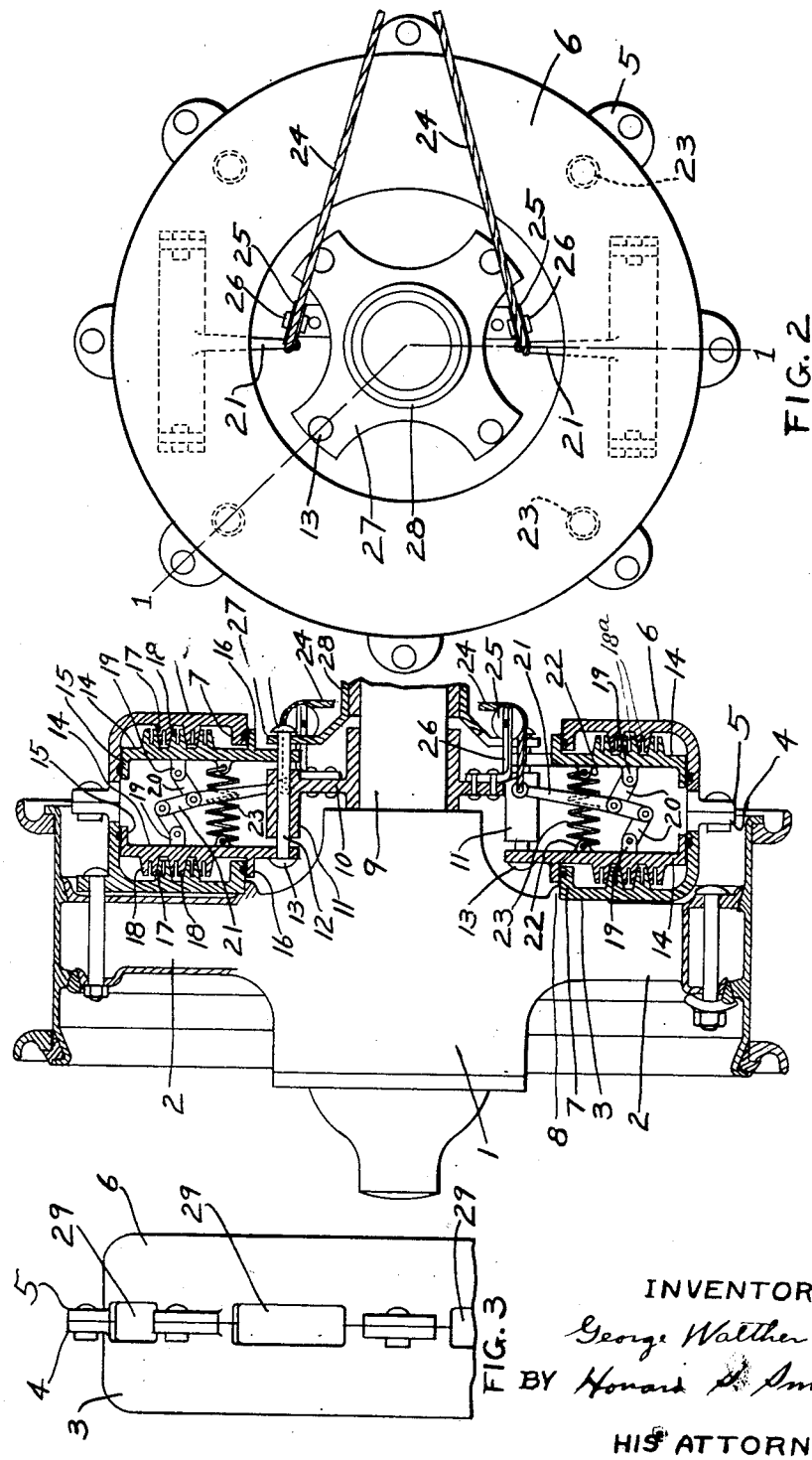
INVENTOR,
George Walther,
BY Howard S. Smith,
HIS ATTORNEY Patented Mar. 4, 1930

1,749,745

UNITED STATES PATENT OFFICE

GEORGE WALTHER, OF NEAR DAYTON, OHIO, ASSIGNOR TO THE DAYTON STEEL FOUNDRY COMPANY, OF DAYTON, OHIO, A CORPORATION OF OHIO

BRAKE DRUM

Application filed November 25, 1925. Serial No. 71,470.

This invention relates to new and useful improvements in brake drums, and is a continuation in part of my application Serial No. 4782, filed January 26th, 1925.

It is the principal object of my invention to provide for vehicle wheels a brake drum in which a large surface is presented to the friction discs or plates by providing them with annular projections which enter grooves formed in the interior surface of the drum.

It is another object of my invention to provide such a brake drum that is made up of two sections to encase toggle or other lever means for forcing the friction discs or plates into engagement with the interior side surfaces of the drum.

A still further object of the invention is to provide in the curved peripheral portion of the brake drum, a series of holes to admit air for cooling purposes.

In the accompanying drawings illustrating my invention, Figure 1 is a longitudinal, sectional view taken through a metal wheel and my improved brake drum attached thereto. Figure 2 is a rear view of the same. And Figure 3 is a side view of the brake drum, showing the air-admitting holes in its curved or circumferential portion.

Referring to the accompanying drawings for a detailed description of the embodiment of my invention which they illustrate, the numeral 1 designates a vehicle wheel, and in this instance a metal one to whose spokes 2 there is bolted or otherwise suitably secured the inner part or half 3 of a metal brake drum that is formed around its outer edge with ears 4. Bolted to the latter are similar ears 5 on the outer part or half 6 of the metal drum.

The inner part 3 of the brake drum is formed near the hub of the wheel 1 with a flanged rim 7 which seats against shoulders 8 on the spokes 2. A similar flanged rim 7 is formed on the outer part 6 of the brake drum. (See Figure 1.)

Surrounding the live axle 9 which drives the wheel 1, is a stationary sleeve 10 supporting a series of axial hollow cylindrical portions 11 to receive guide rods 12 carrying heads 13 on their ends.

Slidable along these rods 12 are two wide central-apertured friction discs or plates 14 which terminate at their outer ends in flanged rims 15 that are movable along the inner, circumferential surfaces of the brake drum sections 3 and 6. Formed on each brake disc 14 is an outwardly projecting flange part 16 that bears against the flange rim 7 of each of the brake drum sections. Thus guided, the friction discs 14, 14 are free to be moved from, and toward, each other within the brake drum by means hereinafter to be described.

Formed on the inner side surface of each of the brake drum sections 3 and 6, are projections such as the beveled annular projections 17 that form between them grooves to receive similar beveled projections 18 on the outer surfaces of the friction discs 14. In order that the projections 18 on the discs 14 may yieldingly engage the drum projections 17, the latter and the disc projections 18 are provided with grooves 18ª near their outer ends. (See Figure 1.)

For the purpose of moving the friction discs 14, 14 away from each other to force their projections 18 against the projections 17 on the drum sections 3 and 6 to apply braking pressure to the wheel, the following means are provided. Formed on each side of the axle 9, at oppositely disposed points on the interior surfaces of the friction discs 14, 14, are ears 19, 19 respectively. Pivotally secured to each ear 19 is a link 20, one of which is pivotally connected to the outer end of a lever 21 and the other to said lever at a point near the point of connection to the first link, to form a toggle mechanism whereby, when the free end of the lever is drawn rearwardly, the friction discs 14, 14 will be moved apart to force the disc projections 18 into engagement with the drum projections 17. (See Figure 1.)

Secured between ears 22, 22, one set on each side of the axle 9, are coil springs 23, 23 which are tensioned when the friction discs 14, 14 are forced away from each other by the toggle means, to withdraw said discs from engagement with their brake drum sections when pressure upon the toggle levers 21, 21 is released.

Attached to the inner ends of the toggle levers 21, 21 are cables 24, 24 which pass around pulleys 25, 25 carried by arms 26, 26 respectively, that are riveted to the sleeve 10. These cables 26, 26 are free to be connected at their outer ends to a brake pedal or other member (not shown) that may be conveniently operated to actuate the braking levers 21, 21.

At their inner ends the guide rods 12 for the braking discs 14, 14 are received by apertured radial projections 27 on the stationary axle housing 28 secured around the live axle 9 to give them additional support. (See Figures 1 and 2.)

Formed in the outer rim portions of the brake drum sections 3 and 6, between the ears 5, are registering notches which provide holes 29 through which air may be freely admitted to the interior of the drum to cool the enclosed braking parts.

Having described my invention, I claim:

1. A device of the type described, comprising a drum attachable to a vehicle wheel and formed of two separable sections, each of which has a grooved inner side portion, and a pair of braking members formed with annular projections for entrance into the grooved portions of the drum when said members are moved apart, for the purpose specified.

2. A device of the type described, comprising a drum attachable to a vehicle wheel and having beveled projections formed around its inner surface, and a braking plate formed with beveled annular projections for entrance between the drum projections, said annular projections on the drum and plate being grooved near their outer ends.

3. The combination with a vehicle wheel and an axle therefor, of an inner brake drum section secured to the inner portion of said wheel around the axle, an outer brake drum section secured to the inner section, a braking plate within each brake drum section for engagement with its side part, and toggle means within said brake drum sections for moving the braking plates away from each other into engagement with the sides of said sections for the purpose specified.

4. The combination with a vehicle wheel and an axle therefor, of an inner brake drum section secured to the inner portion of said wheel around the axle, an outer brake drum section secured to the inner section, a braking plate within each brake drum section for engagement with its side part, a web on said axle between it and the brake drum sections, and axial guide members supported by said web around the axle, and along which the braking plates are free to be moved into engagement with their respective sides of the drum sections.

5. The combination with a vehicle wheel and an axle therefor, of an inner brake drum section secured to the inner portion of said wheel around the axle, an outer brake drum section secured to the inner section, a braking plate within each brake drum section for engagement with its side part, a web on said axle between it and the brake drum sections, axial block portions integral with said web, guide members for said braking plates secured to said block portions, said braking plates being free to be moved along said members into engagement with the sides of the drum sections, a sleeve secured to said axle, and radial projections on said sleeve to receive the outer ends of said guide members.

6. A device of the type described, comprising a drum composed of two connected sections and attachable to a vehicle wheel, and braking means within said drum for frictionally engaging it, said drum sections formed with registering notches to admit air for cooling purposes.

7. A device of the type described, comprising a drum composed of two connected sections and attachable to a vehicle wheel, and braking means within the connected sections for frictionally engaging their sides, the meeting edges of said sections formed with registering notches to provide holes to admit air for cooling purposes.

8. A device of the type described, comprising a drum attachable to a vehicle wheel and having a plurality of projections formed around its inner surface, and a braking plate formed with annular projections for entrance between the drum projections, all of said projections being enclosed by the drum.

In testimony whereof I have hereunto set my hand this 23rd day of November, 1925.

GEORGE WALTHER.